United States Patent [19]

Johnson

[11] 3,999,642
[45] Dec. 28, 1976

[54] CLUTCHING MEANS ADAPTED FOR USE IN TAPPING ATTACHMENTS

[75] Inventor: Allan S. Johnson, Newport Beach, Calif.

[73] Assignee: Tapmatic Corporation, Irvine, Calif.

[22] Filed: Oct. 28, 1975

[21] Appl. No.: 625,879

Related U.S. Application Data

[63] Continuation-in-part of Ser. No. 508,344, Sept. 23, 1974, abandoned, and a continuation-in-part of Ser. No. 520,409, Nov. 4, 1974, Pat. No. 3,946,844, and a continuation-in-part of Ser. No. 599,783, July 28, 1975.

[52] U.S. Cl. .............................. 192/21; 192/48.91; 192/67 R; 64/29; 74/792; 408/139

[51] Int. Cl.² .................. F16D 11/04; F16D 21/02; F16D 7/06

[58] Field of Search ......... 192/21, 48.91, 51, 56 R, 192/67 R; 64/29; 408/139; 74/792

[56] References Cited
UNITED STATES PATENTS

| | | |
|---|---|---|
| 2,291,151 | 7/1942 | Dunn .......................... 192/67 R X |
| 2,544,809 | 3/1951 | Stanely ...................... 192/48.91 X |
| 2,743,804 | 5/1956 | Roberts .......................... 192/48.91 |
| 3,002,206 | 10/1961 | Johnson .............................. 408/139 |
| 3,041,893 | 7/1962 | Johnson .......................... 74/792 X |
| 3,050,321 | 8/1962 | Howe et al. .................. 192/67 R X |
| 3,051,013 | 8/1962 | Zagar ............................... 192/21 X |
| 3,871,498 | 3/1975 | Kitaguchi ...................... 192/48.91 |

Primary Examiner—Allan D. Herrmann
Attorney, Agent, or Firm—Herzig & Walsh, Inc.

[57] ABSTRACT

The invention is an improved clutching means for driving between axially aligned parts and is particularly adaptable in tapping attachments having free axial float. The clutch drive means is in the form of a sleeve having a ball race carrying driving balls interposed between axial splines on a driving part and on the driven splindle part in both direct and reverse drive.

A torque release clutch is provided. It acts on a drive member through which drive is transmitted in both direct and reverse drive so that it will release in the event of excessive torque in either direct or reverse drive.

6 Claims, 8 Drawing Figures

CLUTCHING MEANS ADAPTED FOR USE IN TAPPING ATTACHMENTS

This application is a continuation-in-part of Ser. No. 508,344 filed on Sept. 23, 1974, now abandoned; of application Ser. No. 520,409 filed Nov. 4, 1974, now Pat. No. 3,946,844; and of application Ser. No. 599,783 filed July 28, 1975. These applications are hereby incorporated herein by reference.

BACKGROUND OF THE INVENTION

1. Field of the Invention

The field of the invention is that of clutching means for providing drive between axially aligned members and is particularly adapted for tapping attachments.

2. Description of the Prior Art

The background of the invention with respect to tapping attachments is exemplified in prior patents of this inventor U.S. Pat. Nos. 3,002,206; 3,041,893; 3,397,588; 3,717,392; and 3,791,756, which are hereby incorporated herein by reference. Reference is also made to U.S. Pat. No. 2,325,184. The background patents disclose the characteristics of tapping attachments having free axial float and direct and reverse drive. U.S. Pat. Nos. 3,041,893; 3,397,588; and 3,717,892 are hereby incorporated herein by reference.

SUMMARY OF THE INVENTION

The improvements of the herein invention are adapted to drive the spindle in a tapping attachment substantially without friction. The clutch driver means provides drive through balls carried by a spring biased sleeve. The balls engage between axial splines and grooves on the respective parts. In a preferred embodiment a single sleeve or ball retainer is resiliently carried by the spindle, the balls providing for driving engagement between splines on the clutch driver member and on the spindle.

This invention facilities the engagement of the driving balls with the splines both in direct and reverse drive.

The invention basically is an improved clutching arrangement which facilitates clutching engagement between a driving and driven member and improves the driving relationship.

A primary object is to realize improvements, residing in a ball carrier having ball driving members interposed between rotating parts cooperating with splines, the carrier being resiliently biased for axial movement in either direction.

A further object is to realize a mechanism embodying a torque release clutch having a member through which both direct and reverse drive is transmitted whereby the clutch will release in response to excessive torque in either direct or reverse drive.

Further objects and additional advantages of the invention will become apparent from the following detailed description and annexed drawings wherein:

DESCRIPTION OF THE PREFERRED EMBODIMENTS

Figure 1:
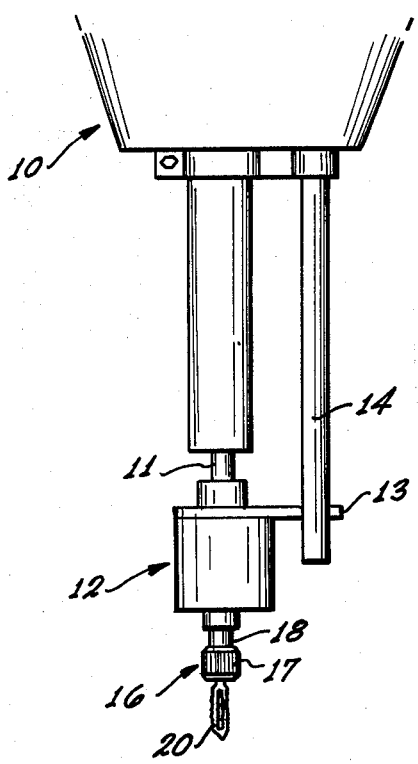
FIG. 1 is a view of a tapping attachment in which the invention may be embodied mounted on a machine.

Referring now more in detail to the various figures of the drawing, numeral 10 designates a machine tool with which the attachment embodying the invention may be used. It has an arbor 11 and the tapping attachment is designated generally at 12. Numeral 13 designates a radial holding arm which engages a stop rod or column 14 which will hold the body of the attachment against rotation as will be described more in detail hereinafter. Numeral 16 designates the chuck on the tapping spindle 18 and the tap itself is designated at 20.

Numeral 18 designates the driven spindle carrying tap chuck 16 and nut 17 which holds the tap 20. See FIG. 1. The tap chuck nut 17 and tap 20 are conventional and may be like those shown in the earlier application and patents referred to.

Figure 2:
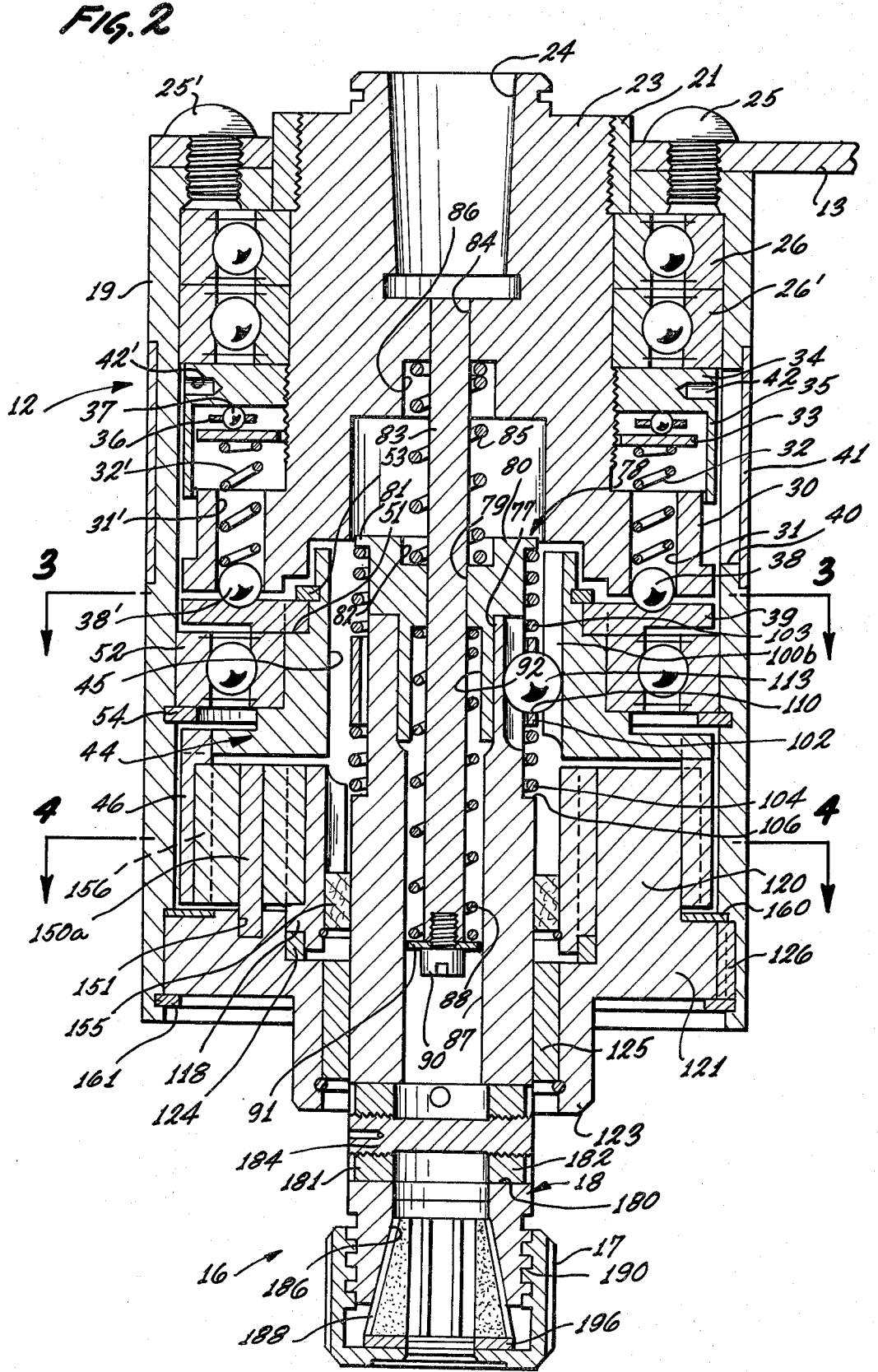
FIG. 2 is a cross-sectional view of the tapping attachment of FIG. 1.

FIG. 2 shows the attachment 12 in cross-section. The attachment has a cylindrical body 19. Within body 19 is part 23 having external threads as shown. The part 23 has a tapered bore 24 in which is received the end of the drive stem or spindle 11. Numeral 20 designates a ring threaded on part 23. Arm 13 is secured to body 19 by screws 25–25'. Numerals 26–26' designate ball bearings journalling part 23 in body 19.

The lower part of the body 23 as designated at 30 is of larger diameter and has angularly spaced axial bores as shown at 31–31' in which are received springs 32–32' which bear against thrust plate 33. Numeral 34 designates a clutch collar having skirt 35. Collar 34 is threaded onto part 23. Numeral 36 designates a ball carrier having balls 37 interposed between thrust plate 33 and clutch collar 34. Springs 32–32' seat on balls 38–38' which fit into depressions in clutch plate 39. The parts as described from an adjustable torque release clutch that is adjustable by adjusting collar 34 on part 23. Access may be had to collar 34 through opening 40 by moving ring 41. Collar 34 is moved by inserting a tool into openings 42–42'.

Numeral 44 designates the direct and reverse drive clutch sleeve. This part is cylindrical having a bore 45. It has an enlarged lower skirt part 46 which drives the reversing gearing. The clutch sleeve 44 forms a square shoulder 51 and on this shoulder rests the clutch plate ring 39. The clutch elements are disposed between the part 23 and the clutch plate ring 39.

Numeral 52 designates a ball bearing which journals clutch sleeve 44. Plate 39 and bearing 52 are held by snap rings 53 and 54 respectively.

Numeral 18 designates the driven spindle which is cylindrical having an end bore 77. Fitting within its upper end is a bushing 78 having a bore 79 and having an upper end part 80 larger diameter which fits against the end of spindle 18 and which has a spring retaining flange 81. It has a counterbore 82. Numeral 83 designates a suspension rod or stem extending from bore 84 in part 23 and which extends through bore 79 in bushing 78. Coil spring 85 is around stem 83 seated in counterbore 82 and bearing against body 23, in counterbore 86.

Spindle 83 has a main bore 87. Stem 83 extends into this bore. In the bore around stem 83 is coil spring 88 which is retained by screw cap 90 and washer 91 on the end of stem 83. The spring normally urges the spindle upwardly. Spring 88 extends into bore 92 in the lower end of bushing 78 which fits into bore 77.

Figure 3:
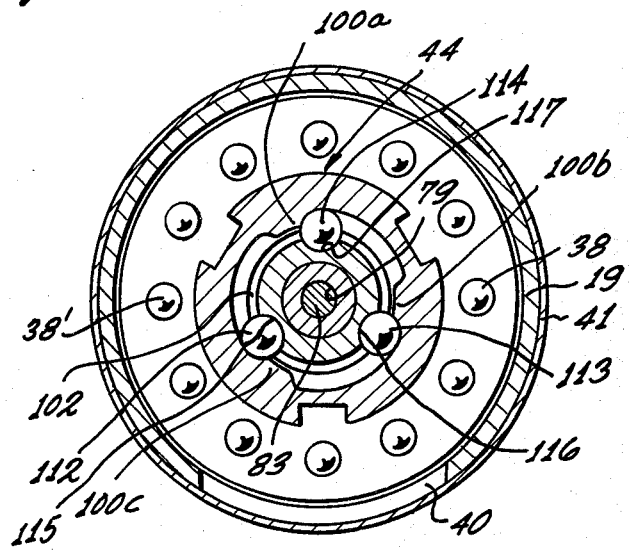
FIG. 3 is a sectional view taken along the line 3—3 of FIG. 2.
Figure 5:
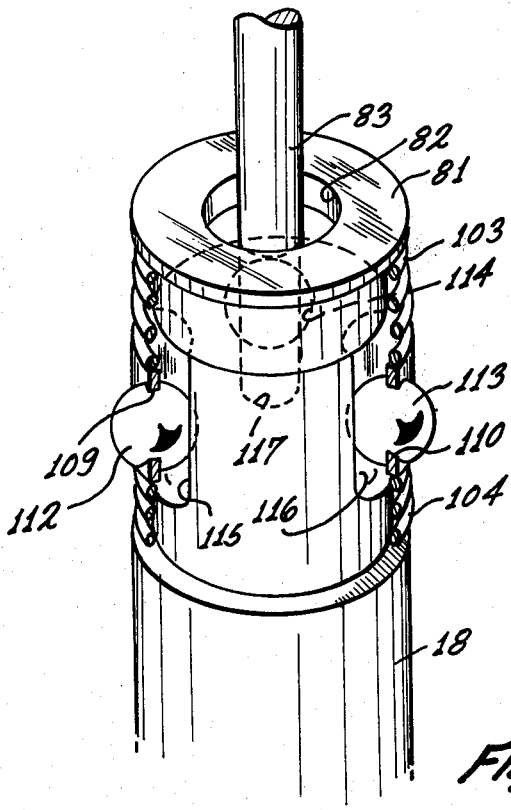
FIG. 5 is a detail view of the ball carrier sleeve.

The clutch sleeve 44 has a bore 45 in which are axial ways formed by splines 100a, 100b and 100c which engage with and drive balls that are carried by a ball carrier member 102 as will be described. The relationship of the parts as so far described may be observed by considering the sectional views FIGS. 2 and 3, and FIG. 5.

Numeral 102 designates the ball carrier member or sleeve which is for both direct drive and for reverse drive.

The member 102 is a sleeve carried on spindle 18. It is cylindrical and is biased by springs 103 and 104 bearing respectively against flange 81 and a shoulder 106 on spindle 18 (see FIG. 5). The angularly spaced splines 100a, 100b and 100c have arcuate sides to conform to the radius of driving balls as will be described. They are angularly spaced as may be seen in FIG. 3. Sleeve 102 forms a ball race or retainer and formed in it are equally angularly spaced ball receiving openings 109, 110 and 111 (see FIG. 5). Received in the openings are driving balls 112, 113 and 114. The balls engage the splines 100a, 100b and 100c on clutch sleeve 44 (see FIGS. 2, 3 and 5). The splines have arcuate axial sides of a radius conforming to that of the balls, and their lower ends are also arcuate. Balls 112, 113 and 114 move axially in grooves 115, 116 and 117 in spindle 18.

Numeral 118 designates the reversing drive clutch sleeve which carries the reverse drive gear 119. The reversing sleeve 118 is driven in reverse direction. Its lower end rests on thrust washer 124. It is within the skirt 46. It is within the bore of planetary gear carrier body 120, the large part 121 of which fits within the end of body 19 and is keyed to it by key 126. Body 120 has openings for three planetary gears. The gear 119 (part 118) is driven by a planetary gear mechanism. The driven spindle 18 rotates within composition spindle bearing 125 which is within the lower end part 123 of body 120 of smaller diameter. The gear carrier has a group of spaces or openings in it as shown at 142a, 142b and 142c in FIG. 4 in which are positioned the planetary gears 143, 144 and 145. These gears as shown are mounted on pins as shown at 150a, 150b and 150c in FIG. 4. These pins are mounted in the gear carrier 120. As shown in FIG. 2, the lower end of the pin 150a is mounted in a bore 151 in a part of the gear carrier 120. Sleeve 118 rotates with bearing or bushing as designated at 155, made of suitable bearing material such as oil impregnated bronze. The planet gears are similarly mounted as described and they mesh with the ring gear 156 which fits within the skirt 46 of the part 44 as shown. Numeral 160 designates a gear washer below the skirt and below part 121 is a Truarc ring 161.

Figure 4:
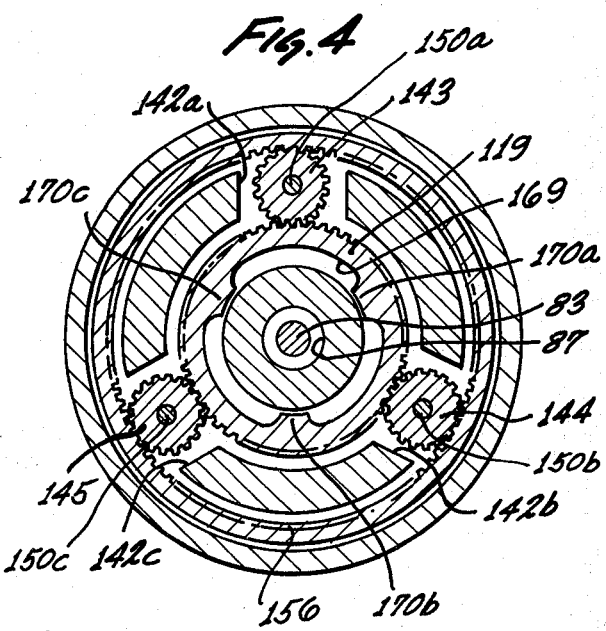
FIG. 4 is a sectional view taken along line 4—4 of FIG. 2.

Provided in bore 169 of reverse drive sleeve 118 are splines 170a, 170b and 170c which are like splines 100a, 100b and 100c (see FIG. 4). Their upper ends are arcuate. As will be described they engage balls 112, 113 and 114 for reverse drive.

The tap holder or chuck 16 of conventional construction, being a cylindrical shape, having a bore at 180 with tap holding jaws 181 and 182, actuatable by threaded stem 184. The lower end of the bore 186 is flared outwardly or tapered as shown in 186. In this tapered part is received an expansible, collapsible tap collet 188, adapted to receive and hold tap 20. The end of the spindle is threaded as shown at 190 to receive the chuck nut 17. Between the chuck nut 17 and the collet 188 is a washer 196, having a tapered bore as shown.

OPERATION

The tap holding spindle has the characteristic of free axial float which is limited as described in the foregoing, the axial float being like that described in the previous patents. The tap follows its own lead. No lead pressure is applied. The machine moves the machine spindle behind the lead of the tap until the desired depth is reached. In operation, it will be understood that the attachment as it starts tapping, moves forwardly with spindle 18 advancing relatively to the housing 19. When the tool reaches the limit of its travel the balls 100a, 100b and 100c will move down with the ball carrier 102 as shown in FIG. 2, the grooves on spindle 18 moving down relatively. Since the balls can roll while moving axially, the drive is transmitted substantially without friction. When the balls as shown in FIG. 2 reach the ends of splines 100a, 100b and 100c, the clutch releases, without friction or chattering. The clutch driver member disengages without knocking or chattering. Spring 103 is compressed or cocked during the movement. When the balls reach the ends of the splines they are quickly moved by the spring into disengagement.

When the spindle 18 moves down balls 112, 113 and 114 come into engagement with splines 170a, 170b and 170c for reverse drive. Since balls 112, 113 and 114 can move axially resiliently in either direction no jamming or binding occurs when the balls engage either the direct or reverse drive splines. In reverse drive the spindle is driven through drive sleeve 118 through the balls. Spring 104 facilitates re-engagement with splines 100a, 100b and 100c in direct drive.

In the event of excessive load the torque release clutch will release and this happens whether the mechanism is in direct or reverse drive since the clutch drives the part 44.

Figure 6:
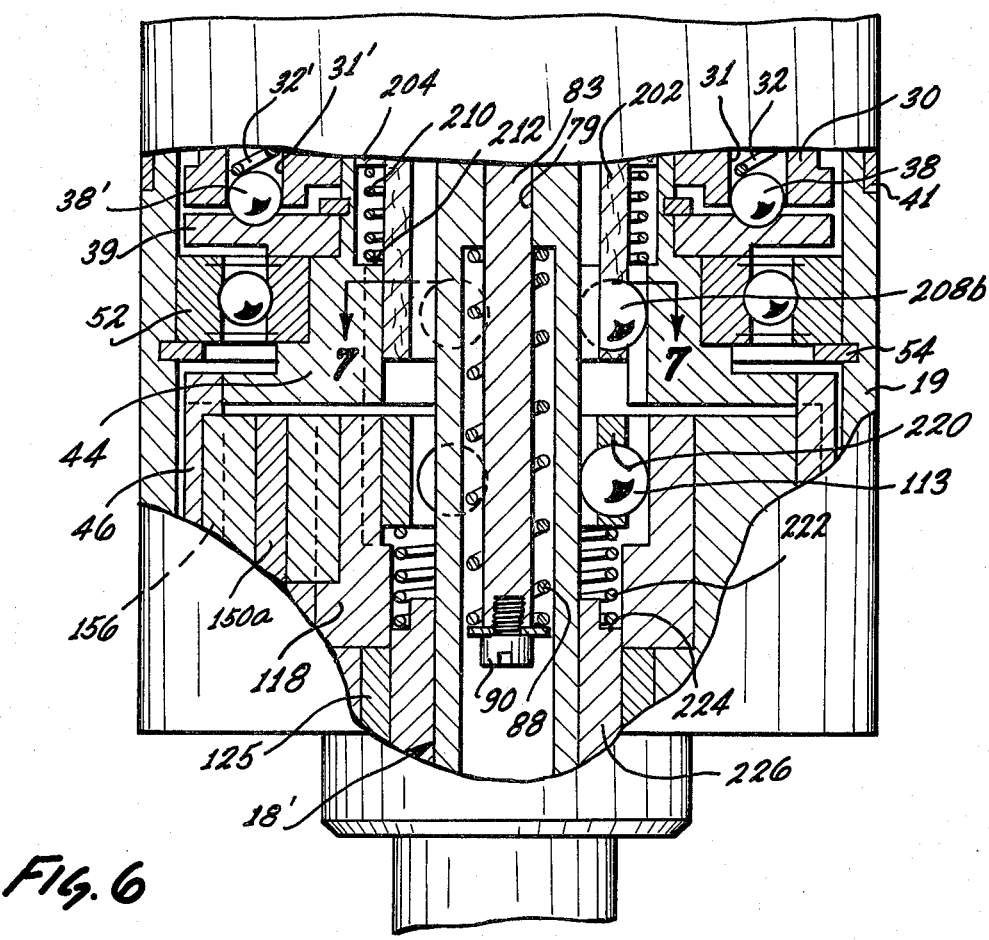
FIG. 6 is a partial sectional view of a modified form of the invention having separate ball carriers for direct and reverse drive.
Figure 7:
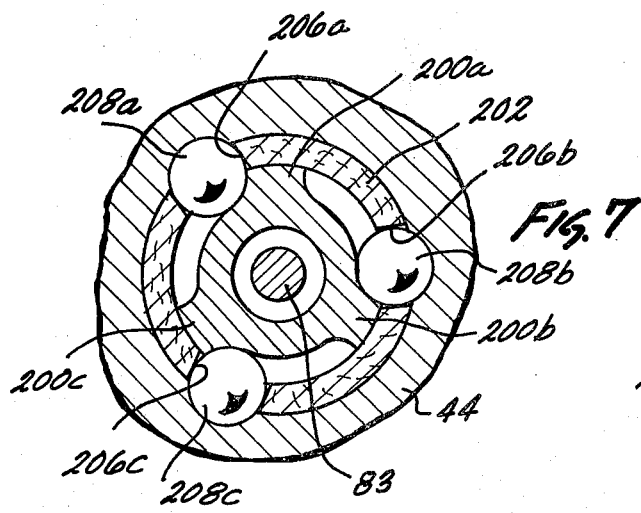
FIG. 7 is a sectional view of the spindle of FIG. 6.
Figure 8:
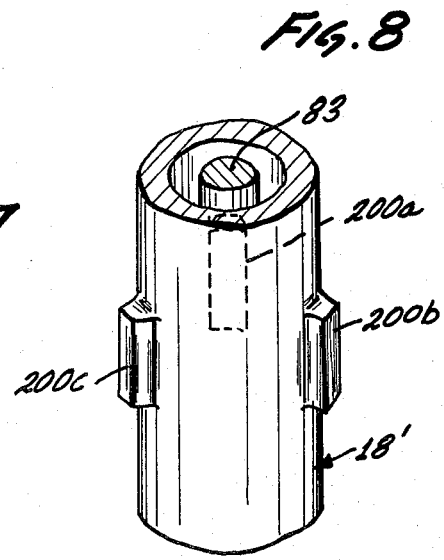
FIG. 8 is a detail view of a part of the spindle.

FIGS. 6, 7 and 8 show a modified form of the invention. Parts in this modification that are the same as in the previous embodiment are identified by the same reference numerals.

The structure in this embodiment is different in the following respects. Instead of using a single carrier for the drive balls for both direct and reverse drive, there are separate ball carriers for direct and reverse drive. Also, whereas in the previous embodiment, the drive ball carrier is carried by the spindle, in the present embodiment the drive ball carriers are not carried by the spindle but are carried concentricly with the spindle.

FIG. 8 shows the spindle 18' having splines 200a, 200b and 200c. Numeral 202 designates the upper drive ball carrier having a flange 204. It is in the form of a sleeve having openings 206a, 206b, and 206c receiving drive balls 208a, 208b and 208c which engage with the splines 200a, 200b and 200c. Carrier 202 is biased by spring 210 which acts on flange or shoulder 204 and at the other end rests on angular shoulder 212 of part 44.

The operation of the ball carrier 202 is similar to that of the previous embodiment. As the spindle 18' moves down relatively, the spring 210 becomes cocked and the balls release or disengage quickly from the splines on the spindle.

Numeral 220 designates a reverse drive ball carrier which is in the form of a cylinder or sleeve having openings for balls, like those already described for the direct drive carrier. It is positioned within the reverse drive member 118 which has axial grooves like the upper part of member 44 to receive the balls, as shown in FIG. 7. It is biased by a spring 222 below the lower end, the spring being retained on an angular shoulder 224 formed in bushing 226 within which the spindle rotates.

The action in reverse drive is similar to that as described in connection with the previous embodiment. The spring 222 facilitates re-engagement in direct drive.

From the foregoing, those skilled in the art will readily understand the nature of the invention and the manner in which the mechanisms operate both in direct drive and in reverse drive. In both forms of the invention the torque release clutch acts on a driving clutch member through which the drive is transmitted in both direct and in reverse drive. Therefore, in the event of excessive torque either in direct or reverse drive, the torque release clutch will release.

The foregoing disclosure is representative of preferred forms of the invention and is to be interpreted in an illustrative rather than a limiting sense, the invention to be accorded the full scope of the claims appended hereto.

I claim:

1. In a coupling means for transmitting torque, in combination, a means for imparting rotary drive, a driven member, direct drive means for driving the member and reverse drive means for driving the member in the opposite direction, a clutch means for shifting between direct and reverse drive, a driving sleeve which is driven by the drive means and having a part positioned to be engaged for direct drive and a second part which engages the reverse drive means, a torque release clutch interposed between the driving means and said driving sleeve whereby the said torque release clutch will respond to excessive torque load either in direct drive or reverse drive.

2. A means as in claim 1, wherein the said direct drive part of the said driving sleeve has a first diameter, a said second part of the driving sleeve having a larger diameter and having reverse drive means interposed between it and the said spindle.

3. A means as in claim 2, wherein said first part of said driving sleeve is a circular member having a first diameter and said second part of the said driving sleeve comprises an integral skirt part having a second diameter.

4. Means as in claim 3 wherein said skirt part includes a ring gear forming part of a planetary reverse gear train.

5. Coupling means as in claim 1 wherein the clutch means includes an axially movable clutching member movable to engage with said first part of the driving sleeve movable to engage with a second part which is driven in the opposite direction by the reverse drive means.

6. Coupling means as in claim 5 wherein said clutch member comprises a ball carrier carrying at least one ball, the ball being engageable between axial configurations on the driven member and on the first part and being movable to engage between axial configurations on the driven member on said second part.

* * * * *